April 7, 1959  C. N. FRENCH  2,880,584
MASTER CYLINDER
Filed June 5, 1957
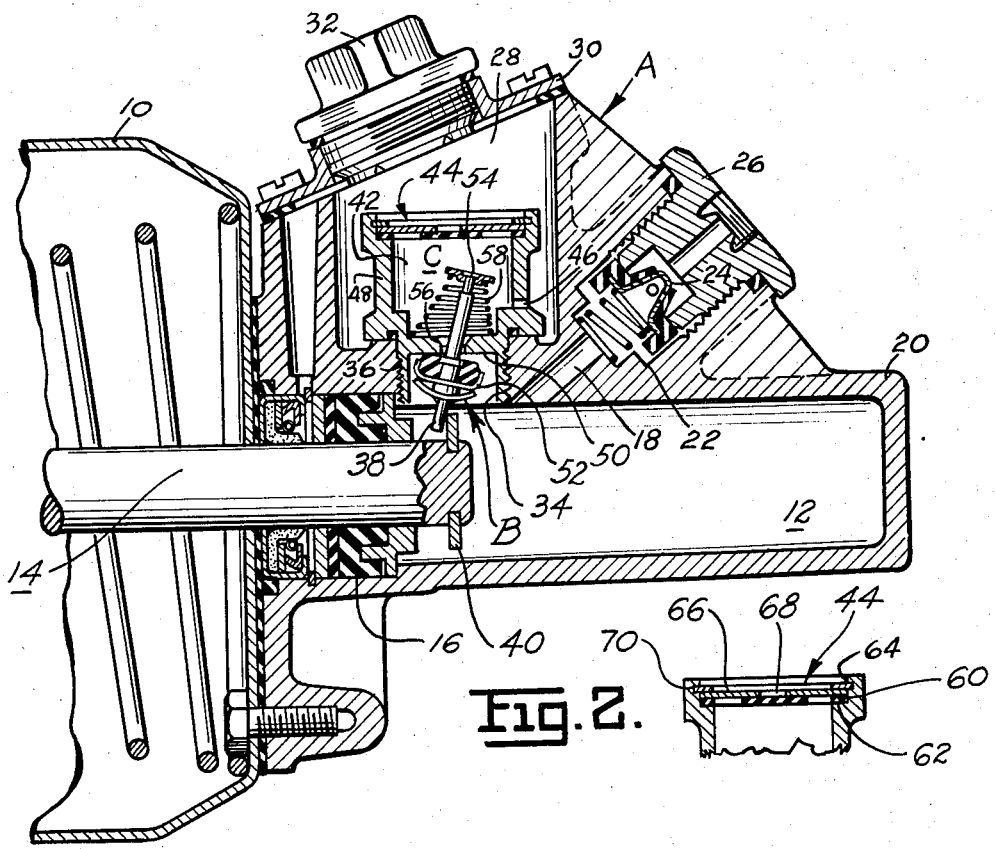
Fig.2.
Fig.1.
Fig.3.
INVENTOR.
CHARLIE N. FRENCH
BY
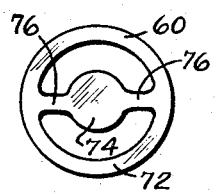
ATTORNEY.

United States Patent Office 2,880,584
Patented Apr. 7, 1959

2,880,584

MASTER CYLINDER

Charlie N. French, South Bend, Ind., assignor to Bendix Aviation Corporation, South Bend, Ind., a corporation of Delaware Application June 5, 1957, Serial No. 663,839

3 Claims. (Cl. 60—54.6)

The present invention relates to a type of check valve structure having particular advantages when used in certain environments; and more especially to a check valve structure peculiarly adapted for use in hydraulic master cylinders to prevent sudden closure of its compensating valve.

An object of the present invention is the provision of a new and improved check valve structure having a minimum of parts and the movable element of which is made from a single piece of sheet material so arranged as to provide both a gasket and a valve closure member supported therefrom.

Another object of the present invention is the provision of a new and improved master cylinder having a poppet type compensating valve between its reservoir and fluid pressure chamber which compensating valve is opened when its fluid displacement member is held in its retracted position and which compensating valve closes when the fluid displacement member is actuated—the improvement including means positioned between the compensating valve and the fluid reservoir which develops a back pressure against the compensating valve during an application of the fluid displacement member which back pressure prevents a slamming shut of the compensating valve when the fluid displacement member is quickly actuated.

The invention resides in certain constructions and combinations and arrangements of parts, and further objects and advantages will be apparent to those skilled in the art to which the invention relates from the following description of the preferred embodiment described with reference to the accompanying drawing forming a part of this specification, and in which:

Figure 1 is a fragmentary cross-sectional view of a power operated master cylinder embodying principles of the present invention;

Figure 2 is a fragmentary cross-sectional view of a check valve structure shown in Figure 1; and Figure 3 is a plan view of the flexible valve closure member shown in Figures 1 and 2.

Referring to Figure 1 of the drawing, there is shown therein a master cylinder A connected to one end of the power cylinder 10 of a fluid pressure servo-motor of the type used to actuate an automotive hydraulic braking system. The master cylinder A comprises a fluid pressure chamber 12 which receives one end of the fluid displacement member 14 which is driven by the movable element (not shown) of the power cylinder. A suitable seal 16 is provided in the end of the fluid pressure chamber adjacent the power cylinder to prevent the escape of fluid therefrom, and an annularly disposed outlet passageway 18 is provided in the body member 20 for conducting fluid pressure to the brake applying wheel cylinders (not shown) of the vehicle. The outer end of the outlet passageway 18 is counterbored as at 22 for the reception of a suitable back pressure valve 24, which is held in place by a combination tubing adapter and end closure member 26.

The body member 20 further includes an integrally cast reservoir 28 positioned above the fluid pressure chamber 12; which reservoir is closed off by cover member 30 having a removable inspection plug 32 therein. A threaded opening 34 communicates the reservoir 28 with the fluid pressure chamber 12. Communication between the reservoir 28 and fluid pressure chamber 12 is controlled by means of a compensating valve structure B mounted in an adapter 36 which is screwed into the opening 34. The compensating valve B employs a poppet type of construction having a depending projection 38 thereon which is abutted by a washer 40 on the fluid displacement member 14 when the fluid displacement member is moved in its retracted position. Retraction of the fluid displacement member therefore opens the compensating valve and permits additional fluid from the reservoir 28 to take the place of any leakage which had occurred during the previous application of the vehicle brakes. The structure so far described is generally old in the art; and for a more complete understanding of the construction and operation reference may be had to the Earl R. Price application 411,386.

According to principles of the present invention, means C is provided in combination with the compensating valve B to improve the operation of the unit. One of the difficulties encountered with the structure described above as being old in the art, has been that sudden closing of the compensating valve B during a quick application of the brakes has caused a sharp bump to be delivered to the foot of the operator through the unit's actuating mechanism. It has been found that the back pressure means C when suitably constructed and used in conjunction with the compensating valve B, will prevent this bump from being felt by the operator, and will otherwise improve the efficiency and reliability of the unit.

The back pressure means C shown in the drawing comprises an enclosed chamber 42 positioned between the compensating valve B and the fluid reservoir 28. While not required in all applications a small orifice 46 may sometimes be provided between the enclosed chamber 42 and reservoir 28 to permit a small leakage of fluid from the fluid pressure chamber 12 into the reservoir 28 as the tilt valve B is moving into engagement with its seat. In the preferred embodiment shown in the drawing, the means C and the compensating valve B are provided in a single unit formed by a generally tubular body 48 having an internal partition 50 therein and through which the valve port 56 of the compensating valve extends. The poppet 52 of the tilt valve is positioned beneath the internal position 50 and is biased upward against the partition by a stem 54 which projects through the valve port 56 and is urged upwardly into a vertical position by means of a coil spring 58. The lower end of the tubular body 48 is screwed into the threaded opening 34 and the upper end of the tubular body 48 is closed off by means of the check valve structure 44.

The check valve structure 44 is a very simple one employing a minimum of parts which in themselves can be very cheaply made. The check valve structure 44 comprises a flexible member 60 which is stamped from a sheet of flexible material preferably synthetic rubber. The flexible member 60 is positioned against a shoulder 62 provided by means of a counterbore 64 in the upper end of the tubular body 48. A circular closure member 66 having at least one generally centrally located opening or hole 68 therethrough is positioned in the counterbore 64 against the flexible member 60; and the flexible member and closure member are biased toward the shoulder and held in place by a snap ring 70.

The flexible member 60 is formed in a manner providing an annular outer area capable of acting as a gasket or seal between the shoulders 62 and the closure member 66 to prevent the leakage of fluid therepast. The member 60 also includes a center generally circular valve closure area adequately sized to cover the opening or openings 68 in the closure member 66, and at the same time provide a seal with respect to the surrounding area of the closure member—which central area 74 is connected with the annular outer area 72 by means of two or more radially extending supporting sections 76. It is desired in the embodiment shown in the drawing, to provide a check valve structure which requires a minimum of differential pressure thereacross to open the structure; and which at the same time requires a minimum of flow in the opposite direction to close the structure and prevent further flow of fluid in the reverse direction. The radially extending supporting sections 76 of the embodiment shown in the drawing have been made sufficiently narrow so as to require a minimum of force to move the center valve closure area 74 away from the closure member 66 to permit flow through the valve. The radial extending sections 76 still, however, are of a sufficient cross-section to adequately support the center section 74 and hold it in a position overlying the opening 68. When the brakes of the vehicle are actuated and the fluid displacement member 14 is forced into the fluid pressure chamber 12, fluid will be forced out of the chamber 12 through the passageway 18 and connection 26 to apply the brakes of the vehicle. The initial movement of the fluid displacement member 14 into the chamber 12 moves the washer 40 forwardly permitting the depending projection 38 of the compensating valve structure B to move forwardly and thereby permit the coil spring 58 to bias the poppet 52 up into firm engagement with the internal partition 50.

Were it not for the back pressure means C, initial displacement of the hydraulic fluid by the fluid displacement member 14 would cause fluid to flow past the poppet 52 into the reservoir 28 until the poppet member 28 is rocked into complete engagement with the internal partition 50 to close off the valve port 56. Substantially no pressure would be developed in the fluid pressure chamber 12 while the flow through the valve port 56 occurred, and the velocity of the fluid past the poppet 52 would produce a decrease in pressure between the poppet 52 and the partition 50 tending to slam the poppet 52 into engagement with the partition. Under such conditions, actuation of the fluid displacement member 14 would be accompanied by an initial period in which substantially no pressure is developed in the fluid pressure chamber 12 until such time as the poppet 52 is slammed into engagement with its seat 50, and following which an abrupt rise in pressure would be experienced in the fluid pressure chamber 12. Such an abrupt rise in pressure would of course be transmitted through the fluid displacement member 14 and its actuating mechanism to the foot of the operator applying the brakes of the vehicle.

With the use of the back pressure means C, substantially no flow passes through the valve port 56 to the reservoir 28 during the initial displacement of the member 14; and the pressure begins to build up in the chamber 12 from substantially the very beginning of the actuating movement of the fluid displacement member 14. Since substantially no, or very little flow, proceeds through the valve port 56 during actuation of the brakes, movement of poppet 52 into engagement with the partition 50 does not produce a rapid build up in pressure in the fluid pressure chamber 12 which will produce a "bumping" or unpleasant sensation to the operator of the braking system.

In those instances in which a small by-pass orifice 46 is used in conjunction with the back pressure means C, a limited small flow will proceed through the valve port 56 during the initial movement of the fluid displacement member 14 causing a gradual build up in pressure within the fluid pressure chamber 12. The amount of flow permitted by the orifice 46 will however, be small enough to prevent large flows through the valve port 56 from slamming the poppet 52 into engagement with its seat 50; and inasmuch as it produces a back pressure against the fluid pressure chamber 12, there will be no rapid build up in pressure when the poppet 52 does engage its seat 50.

It will be seen that there has been provided a check valve structure having a minimum of parts which can be made by a pair of stampings, one of sheet metal, and the other of a flexible sheet material. The member formed from the flexible sheet material not only acts as a valve closure member but is provided with an annular portion which acts as a support for the center closure area and also forms a gasket or seal for the valve structure.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. In a master cylinder for automotive hydraulic braking systems and the like, a body member having a fluid pressure chamber therein with an outlet passageway, a fluid displacement member in said chamber, a reservoir for supplying compensating fluid to said chamber, flow passage means connecting said reservoir and said chamber, valve means in said flow passage means constructed and arranged to be opened when said fluid displacement member is in its retracted position and to be closed by the initial fluid displacing movement of said fluid displacement member from its retracted position, a normally generally closed check valve operatively positioned between said reservoir and said valve means and constructed and arranged to permit flow from said reservoir into said flow passage means, and an orifice in parallel with said check valve, whereby flow from said fluid pressure chamber to said reservoir past said valve means during the initial movement of said fluid displacement member from its retracted position is throttled through said orifice as said valve means approaches its closed position to produce a cushioning effect with respect to said valve means.

2. In a master cylinder for automotive hydraulic braking systems and the like, a body member having a fluid pressure chamber therein with an outlet passageway, a fluid displacement member in said chamber, a reservoir positioned above said chamber, flow passage means connecting said reservoir and said chamber, valve means in said flow passage means constructed and arranged to be opened when said fluid displacement member is in its retracted position and to be closed by the initial fluid displacing movement of said fluid displacement member from its retracted position, means forming an enclosure between said valve means and said reservoir, a first orifice between said enclosure and said reservoir, a second orifice between said enclosure and said reservoir, and a flexible flap in said enclosure held adjacent said first orifice, whereby flow from said fluid pressure chamber to said reservoir past said valve means during the initial movement of said fluid displacement member from its retracted position causes said flexible flap to close said first orifice and the flow is thereafter throttled through said second orifice as said valve means approaches its closed position to thereby produce a cushioning effect upon said valve means.

3. In a master cylinder for automotive hydraulic braking systems and the like, a body member having a fluid pressure chamber therein with an outlet passageway, a fluid displacement member in said chamber, a reservoir positioned above said chamber, flow passage means connecting said reservoir and said chamber, valve means in said flow passage means constructed and arranged to be opened when said fluid displacement member is in its retracted position and to be closed by the initial fluid displacing movement of said fluid displacement member from its retracted position, means forming an enclosure between said valve means and said reservoir, said enclosure having a smooth surface therein in which a first orifice is positioned between said enclosure and said reservoir, a second orifice between said enclosure and said reservoir, and a flexible flap in said enclosure comprising a center disc portion positioned over said first orifice, an outer annular portion held by said body member, and interconnecting radial portions which hold and bias the center disc portion to a position adjacent said smooth surface surrounding said first orifice, whereby flow from said fluid pressure chamber to said reservoir past said valve means during the initial movement of said fluid displacement member from its retracted position is throttled as said valve means approaches its closed position to produce a cushioning effect with respect to said valve means.

References Cited in the file of this patent

UNITED STATES PATENTS

| | | |
|---|---|---|
| 471,630 | Walker | Mar. 29, 1892 |
| 1,350,610 | Henig | Aug. 24, 1920 |
| 1,807,029 | Dunning | May 26, 1931 |
| 2,052,098 | Lockett | Aug. 25, 1936 |
| 2,205,806 | Belenkij | June 25, 1940 |
| 2,380,597 | Hess | July 31, 1945 |
| 2,429,984 | Berglund | Nov. 4, 1947 |

FOREIGN PATENTS

| | | |
|---|---|---|
| 755,309 | Germany | Oct. 11, 1954 |